United States Patent
Kurts et al.

(10) Patent No.: US 7,363,523 B2
(45) Date of Patent: Apr. 22, 2008

(54) METHOD AND APPARATUS FOR CONTROLLING POWER MANAGEMENT STATE TRANSITIONS

(75) Inventors: Tsvika Kurts, Haifa (IL); Alon Naveh, Ramat Hasharon (IL); Efraim Rotem, Haifa (IL); Brad M. Dendinger, Hillsboro, OR (US); Jorge P. Rodriguez, Portland, OR (US); Ernest Knoll, Haifa (IL); David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 10/931,565

(22) Filed: Aug. 31, 2004

(65) Prior Publication Data

US 2006/0047986 A1 Mar. 2, 2006

(51) Int. Cl.
G06F 1/32 (2006.01)
G06F 1/00 (2006.01)
G01R 21/06 (2006.01)

(52) U.S. Cl. .............. 713/320; 713/323; 702/60
(58) Field of Classification Search ............... 713/320, 713/323, 324; 702/60
See application file for complete search history.

(56) References Cited

U.S. PATENT DOCUMENTS

| | | | | |
|---|---|---|---|---|
| 5,530,879 | A * | 6/1996 | Crump et al. | 713/323 |
| 5,560,022 | A | 9/1996 | Dunstan et al. | 395/750 |
| 6,021,500 | A | 2/2000 | Wang et al. | 713/320 |
| 6,118,306 | A | 9/2000 | Orton et al. | 327/44 |
| 6,272,642 | B2 | 8/2001 | Pole, II et al. | 713/300 |
| 6,499,102 | B1 | 12/2002 | Ewertz | 713/1 |
| 6,523,128 | B1 | 2/2003 | Stapleton et al. | 713/330 |
| 6,535,798 | B1 | 3/2003 | Bhatia et al. | 700/293 |
| 6,571,341 | B1 | 5/2003 | Forbes | 713/323 |
| 6,584,573 | B1 | 6/2003 | Wunderlich et al. | 713/322 |
| 6,633,987 | B2 | 10/2003 | Jain et al. | 713/300 |
| 6,691,234 | B1 | 2/2004 | Huff | 713/300 |
| 6,691,238 | B1 | 2/2004 | Forbes et al. | 713/323 |
| 6,823,240 | B2 | 11/2004 | Cooper | 700/299 |

(Continued)

FOREIGN PATENT DOCUMENTS

WO WO 98/44405 10/1998

OTHER PUBLICATIONS

PCT International Search Report and Written Opinion of the International Search Authority, Application No.: PCT/US2005/026941 mailed Jul. 29, 2005. pp. 11.

(Continued)

Primary Examiner—Suresh K Suryawanshi
(74) Attorney, Agent, or Firm—Derek J. Reynolds

(57) ABSTRACT

An integrated circuit device, such as a processor initiates a transition to a first power management state. The device then receives a request to exit the first power management state and, in response exits the first power management state at the highest of a reference operating voltage, such as a minimum operating voltage, and a current voltage. For one aspect, an analog to digital converter may be used to determine the current voltage level. Further, for one aspect the first power management state may be a deeper sleep (C4) state, and the processor may quickly exit to a C2 state in response to a bus event such as a bus snoop.

29 Claims, 8 Drawing Sheets

U.S. PATENT DOCUMENTS

| | | | |
|---|---|---|---|
| 6,954,864 B2 | 10/2005 | Schelling | 713/310 |
| 6,988,214 B1 * | 1/2006 | Verdun | 713/320 |
| 7,010,438 B2 * | 3/2006 | Hancock et al. | 702/60 |
| 7,103,786 B2 * | 9/2006 | Chen et al. | 713/320 |
| 2002/0026597 A1 | 2/2002 | Dai et al. | 713/322 |
| 2003/0009702 A1 | 1/2003 | Park | 713/300 |
| 2004/0019815 A1 | 1/2004 | Vyssotski et al. | 713/322 |

OTHER PUBLICATIONS

PCT International Preliminary Report on Patentability, Application No.: PCT/US/2005/026941 mailed Mar. 8, 2007. pp. 7.

* cited by examiner

METHOD AND APPARATUS FOR CONTROLLING POWER MANAGEMENT STATE TRANSITIONS

BACKGROUND

An embodiment of the present invention relates to the field of electronic systems and, more particularly, to a method and apparatus for controlling power management state transitions, and, in particular, transitions into and out of a deeper sleep state, for example.

Power consumption continues to be an important issue for many current computing system including personal computers, wireless handsets, personal digital assistants, etc.

In today's mobile computing environment, for example, to address power dissipation concerns, certain components may be placed into lower power states based on reduced activity or demand. For one approach, an operating system may support a built-in power management software interface such as Advanced Configuration and Power Interface (ACPI). ACPI describes a power management policy including various "C states" that may be supported by processors and/or chipsets. For this policy, C0 is defined as the Run Time state in which the processor operates at high voltage and high frequency. C1 is defined as the Auto HALT state in which the core clock is stopped internally. C2 is defined as the Stop Clock state in which the core clock is stopped externally. C3 is defined as the Deep Sleep state in which all processor clocks are shut down, and C4 is defined as the Deeper Sleep state in which all processor clocks are stopped and the processor voltage is reduced to a lower data retention point. Of the various C states, C4 or Deeper Sleep, is the lowest power state.

In operation, to enter the Deeper Sleep state, ACPI may detect a time slot in which there are no new or pending interrupts to the mobile processor. The ACPI policy then uses input/output (I/O) controller or other chipset features to place the mobile processor into the Deeper Sleep state.

Once the processor is placed into this C4 state, a break event or interrupt from the operating system or another source may be sent to the chipset, and the chipset will then allow the processor to exit the Deeper Sleep state. The ability to transition between various power management states, including the Deeper Sleep state, may enable power dissipation to be reduced and battery life to be increased.

Currently, entry into Deeper Sleep is done by referencing an external voltage reference in the processor voltage regulator circuit and regulating to this reference voltage whenever a platform "Deeper Sleep" signal such as a DPRSLPVR signal or other similar signal is asserted by the I/O controller or other integrated circuit. The voltage regulator then transitions from a first voltage to a second lower voltage associated with the Deeper Sleep state. Upon exiting the Deeper Sleep state, a voltage transition in the other direction takes place with a similar specified time window. Using current approaches, Deeper Sleep entry and exit latency times may be relatively large and may lead to system performance degradation and/or reduce potential power savings.

In some cases, the Deeper Sleep entry/exit latencies may further prevent some systems from ever entering the Deeper Sleep state. For example, systems that include an active Universal Serial Bus 1 (USB1) and/or AC'97 (Audio Codec '97) device may have difficulty entering the C4 power state because the operating system may not tolerate the long latency associated with transitioning out of C4 and back to C0 to handle a USB1 interrupt. Where there is a concern that interrupts may be lost due to this latency, a processor may be prevented from entering the C4 state altogether. The result may be an increase in the processor average power dissipation and a reduction in battery life versus systems that are able to enter C4.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method and apparatus for controlling power management state transitions is described. In the following description, particular components, circuits, state diagrams, software modules, systems, timings, etc. are described for purposes of illustration. It will be appreciated, however, that other embodiments are applicable to other types of components, circuits, state diagrams, software modules, systems, and/or timings, for example.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Figure 2:
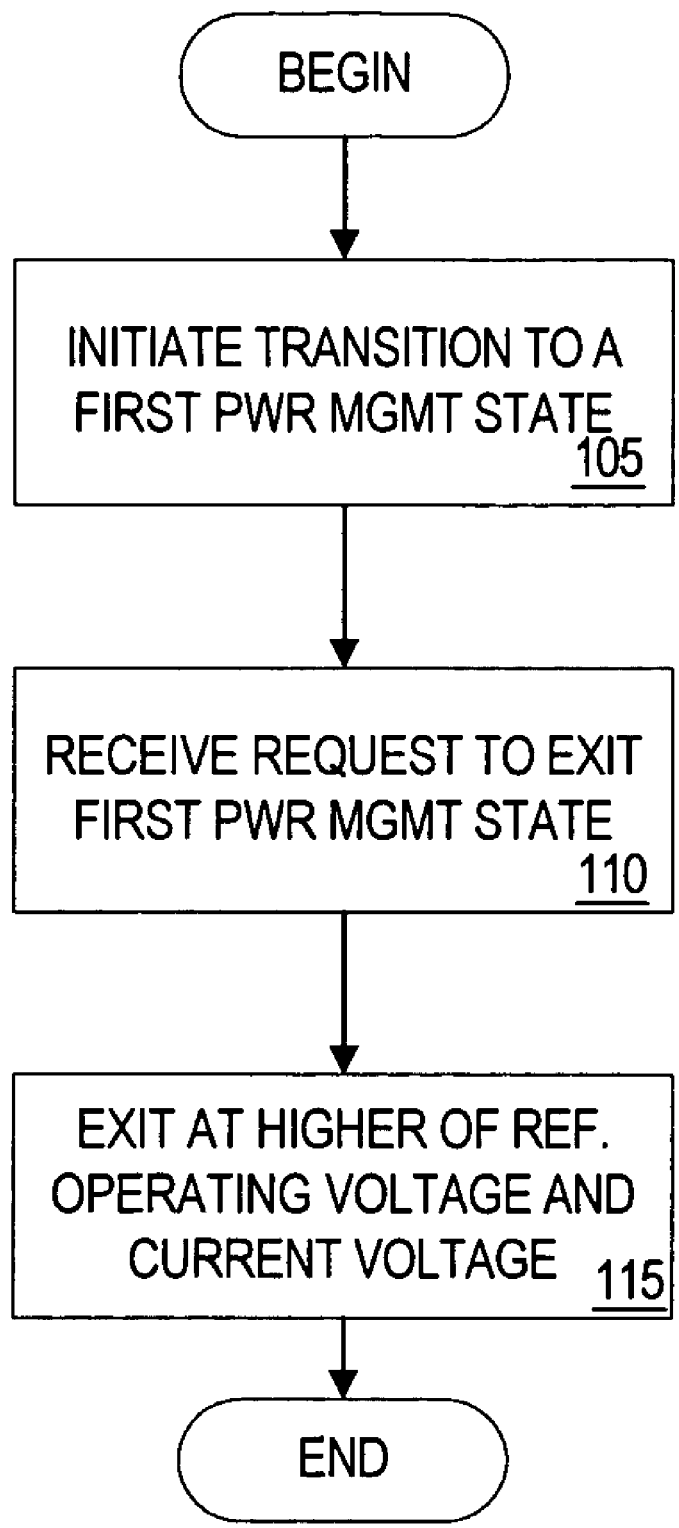
FIG. 2 is a high-level flow diagram of a power management state transition approach of one embodiment.

Referring to FIG. 2, for one embodiment, an integrated circuit device such as a processor, for example, initiates a transition to a first power management state at block 105. The first power management state may be, for example, a Deeper Sleep state. Subsequently, in response to receiving a request to exit the first power management state at block 110, the device exits the first power management state at the higher of a reference operating voltage and a current voltage at block 115. For some embodiments, the reference operating voltage may be a minimum active state operating voltage, for example.

Further details of this and other embodiments are provided in the description that follows.

Embodiments of the invention may be implemented in one or a combination of hardware, firmware, and software. Embodiments of the invention may also be implemented in whole or in part as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 3:
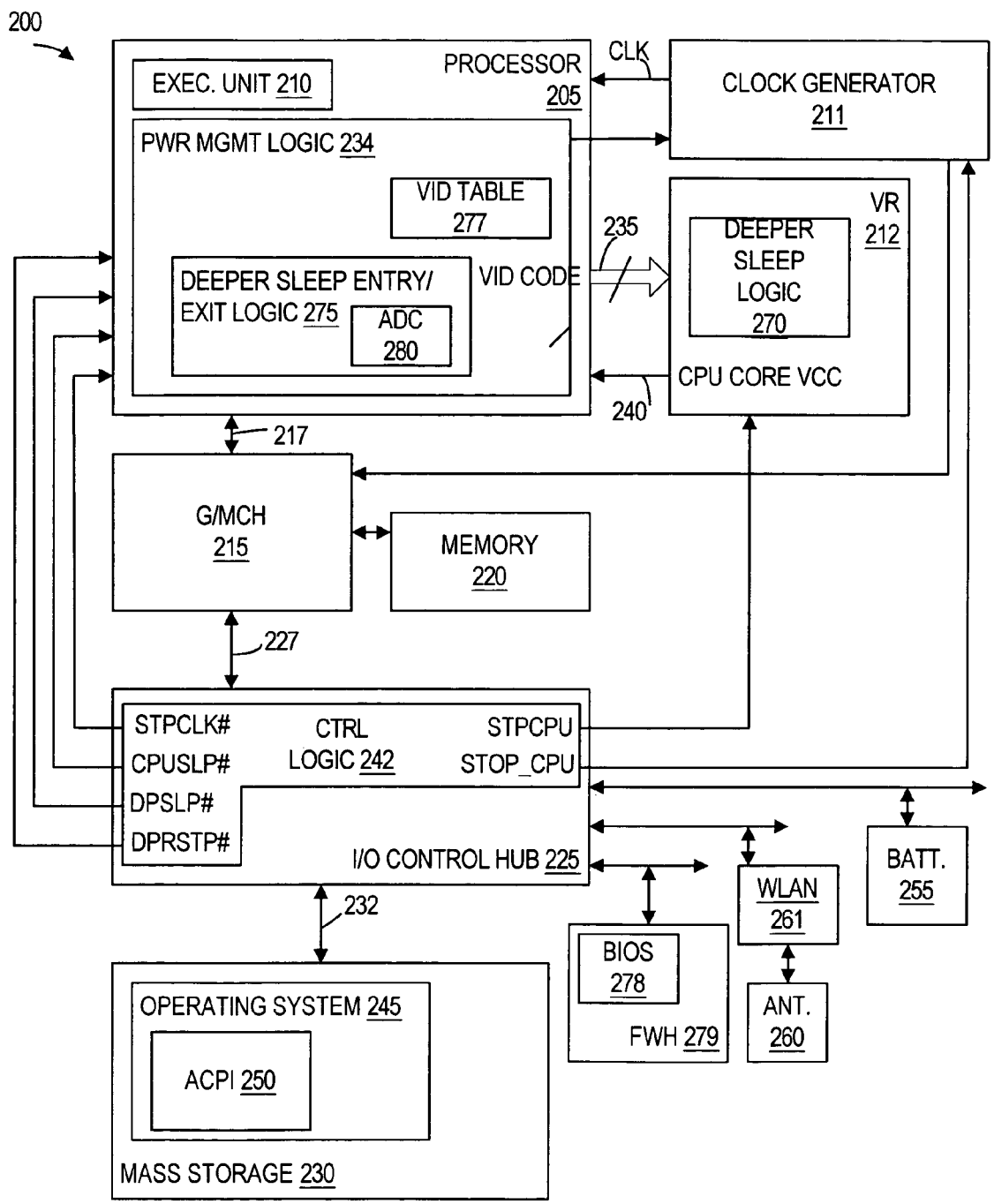
FIG. 3 is a block diagram of an exemplary computing system in which the power management state transition control approach of one embodiment may be advantageously implemented.

FIG. 3 is a block diagram of an exemplary system 200 that may advantageously implement the power management state transition approach of one or more embodiments. The system 200 is a notebook or laptop computer system, but may be a different type of electronic system such as a personal digital assistant, wireless telephone/handset or a desktop or enterprise computing system, for example, for other embodiments. Other types of electronic systems are within the scope of various embodiments.

The system 200 includes a processor 205, a platform-level clock generator 211, a voltage regulator 212 coupled to the processor 205, a memory control hub 215 coupled to the processor 205 over a bus 217, a memory 220 which may comprise one or more of random access memory (RAM), flash memory and/or another type of memory, an input/output (I/O) control hub 225 coupled to the memory control hub 215 over a bus 227, and a mass storage device 230 coupled to the I/O control hub 225 over a bus 232.

For one embodiment, the processor 205 may be an Intel® architecture microprocessor such as, for example, a follow-on processor to the Intel Pentium® M processor including one or more processing cores and at least one execution unit 210 to process instructions. For such embodiments, the processor 205 may include Intel SpeedStep® technology or another power management-related technology that provides for two or more voltage/frequency operating points. An associated power management unit 234 may be included on the processor 205 to control transitions between two or more of the voltage/frequency pairs.

For other embodiments, the processor 205 may be a different type of processor such as a digital signal processor, an embedded processor, or a microprocessor from a different source.

Where Intel SpeedStep® technology or another type of power management technology is included on the processor 205, the available voltage/frequency pairs associated with the technology include a minimum voltage/frequency pair corresponding to a minimum active mode operating voltage and a minimum operating frequency associated with the processor 205 for a fully functional operational mode. These may be referred to herein as the minimum operating voltage and minimum operating frequency or minimum active mode operating voltage and frequency, respectively. Similarly, a maximum operating voltage and frequency may be defined. Other available voltage frequency pairs may be referred to as operating voltage/frequency pairs or simply other voltage/frequency or frequency/voltage pairs.

Deeper Sleep entry/exit logic 275 may also be included on the processor, either within or outside of the power management unit 234, to control entry into and exit from the Deeper Sleep state, also referred to herein as the C4 state. Portions of exemplary Deeper Sleep entry/exit logic that may be used to provide the Deeper Sleep entry/exit logic 275 are described in more detail below in reference to FIG. 8.

A voltage identification (VID) memory 277 that is accessible by the Deeper Sleep entry/exit logic 275 may be included to store a voltage identification code look-up table. The VID memory may be an on- or off-chip register or another type of memory, and the VID data may be loaded into the memory via software, basic input/output system (BIOS) code 278 (which may be stored on a firmware hub 279 or in another memory), an operating system, other firmware and/or may be hardcoded, for example. Alternatively, a software look-up table including VID and related data may be otherwise accessible by the logic 275.

An analog-to-digital converter (ADC) 280 may also be provided as part of the Deeper Sleep entry/exit logic 275 to monitor a voltage supply level and provide an associated digital output as described in more detail below. Exemplary ADC logic that may be used to provide the ADC 280 is discussed in more detail below in reference to FIG. 5.

The voltage regulator 212 provides a supply voltage to the processor 205 and may be in accordance with a version of the Intel Mobile Voltage Positioning (IMVP) specification such as the IMVP-6 specification, for example. For such embodiments, the voltage regulator 212 is coupled to receive VID signals from the processor 205 over a bus 235 and, responsive to the VID signals, provide an associated supply voltage to the processor 205 over a signal line 240. The voltage regulator 212 may include Deeper Sleep logic 270 that is responsive to one or more signals to provide a Deeper Sleep voltage to the processor 205. For other embodiments, a different type of voltage regulator may be used, including a voltage regulator in accordance with a different specification. Further, for some embodiments, the voltage regulator may be integrated with another component of the system 200 including the processor 205.

The memory control hub 215 may include both graphics and memory control capabilities and may alternatively be referred to herein as a graphics and memory control hub (G/MCH) or a North bridge. The graphics and memory control hub 215 and the I/O control hub 225 (which also may be referred to as a South bridge) may be collectively referred to as the chipset. For other embodiments, chipset features may be partitioned in a different manner and/or may be implemented using a different number of integrated circuit chips. For example, for some embodiments, graphics and memory control capabilities may be provided using separate integrated circuit devices.

The I/O control hub 225 of one embodiment includes power management state control logic 242, alternatively referred to herein as C-state control logic. The power management state control logic 242 may control aspects of the transitions between some power management and/or normal operational states associated with the processor 205, either autonomously or in response to operating system or other software or hardware events. For example, for Intel® architecture processors for which at least active mode and power management states referred to as C0, C1, C2 and C4 are supported, the power management state control logic 242 may at least partially control transitions between at least a subset of these states using one or more of a stop clock (STPCLK#), processor sleep (CPUSLP#), deep sleep (DPSLP#), deeper stop (DPRSTP#), and/or stop processor (STPCPU#) signals as described in more detail below.

For other types of architectures and/or for processors that support different power management and/or normal operational states, the power management state control logic 242 may control transitions between two or more different power management and/or normal operational states using one or more signals that may be similar to or different from the signals shown in FIG. 3.

The mass storage device 230 may include one or more compact disc read-only memory (CD-ROM) drive(s) and associated disc(s), one or more hard drive(s) and associated disk(s) and/or one or more mass storage devices accessible by the computing system 200 over a network. Other types of mass storage devices such as, for example, optical drives and associated media, are within the scope of various embodiments.

For one embodiment, the mass storage device 230 stores an operating system 245 that includes code 250 to support a current and/or a follow-on version of the Advanced Configuration and Power Interface (ACPI) specification (currently rev 2.0c). ACPI may be used to control some aspects of power management as described in more detail below. The operating system 245 may be a Windows™ or another type of operating system available from Microsoft Corporation of Redmond, Wash. Alternatively, a different type of operating system such as, for example, a Linux operating system, and/or a different type of operating system-based power management may be used for other embodiments. Further, the power management functions and capabilities described herein as being associated with ACPI may be provided by different software or hardware.

Where the system 200 is a mobile or portable system, a battery or battery connector 255 may be included to provide power to operate the system 200 either exclusively or in the absence of another type of power source. Additionally, for some embodiments, an antenna 260 may be included and coupled to the system 200 via, for example, a wireless local area network (WLAN) device 261 to provide for wireless connectivity for the system 200.

It will be appreciated that the system 200 and/or other systems of various embodiments may include other components or elements not shown in FIG. 3 and/or not all of the elements shown in FIG. 3 may be present in systems of all embodiments.

The power management state transition approach of some embodiments is now described in reference to FIGS. 1 and 3-8.

Figure 1:
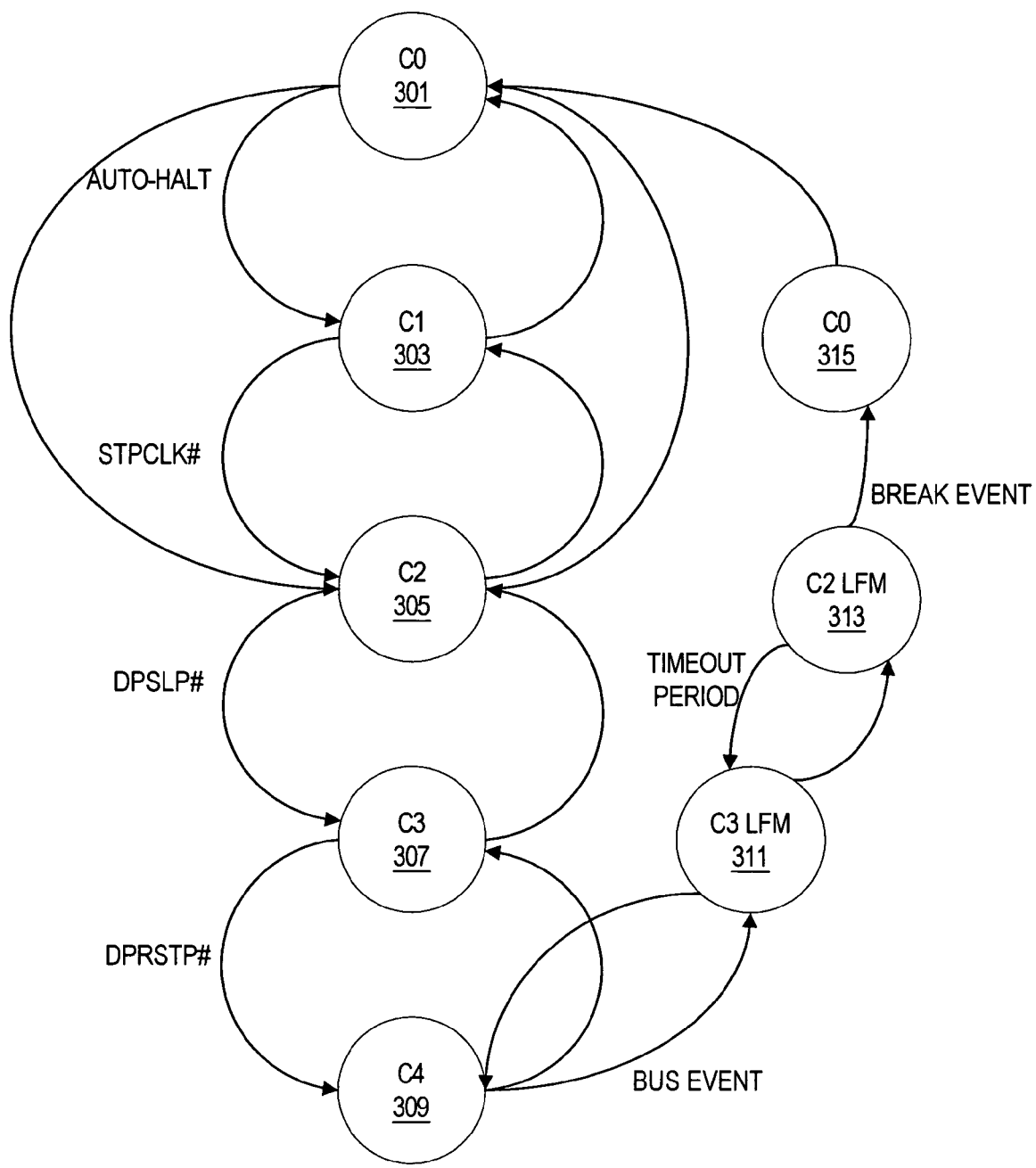
FIG. 1 is a state diagram showing power management state transitions associated with one embodiment.

First, FIG. 1 is a state diagram illustrating the transitions between various C-states in which the processor 205 of FIG. 3 may operate for one embodiment. The normal operational state or active mode for the processor 205 is the C0 state 301 in which the processor actively processes instructions. In the C0 state, the processor is in a high-frequency mode (HFM) in which the voltage/frequency setting may be provided by the maximum voltage/frequency pair.

In order to conserve power and/or reduce thermal load, for example, the processor 205 may be transitioned to a lower power state whenever possible. For example, from the C0 state, in response to firmware, such as microcode, or software, such as the operating system 245, executing a HALT or MWAIT instruction (not shown), the processor 205 may transition to the C1 or Auto-HALT state 303. In the C1 state, portions of the processor 205 circuitry may be powered down and local clocks may be gated.

The processor may transition into the C2 state 305, also referred to as the stop grant or SLEEP state, upon assertion of the STPCLK# or similar signal by the I/O controller 225, for example. The I/O controller 225 may assert the STPCLK# signal in response to the operating system 245 determining that a lower power mode may be or should be entered and indicating this via ACPI software 250. In particular, one or more ACPI registers (not shown) may be included in the I/O controller 225 and the ACPI software 250 may write to these registers to control at least some transitions between states. During operation in the C2 state, portions of the processor 205 circuitry may be powered down and internal and external core clocks may be gated. For some embodiments, the processor may transition directly from the C0 state 301 into the C2 state 305 as shown.

Similarly, the processor 205 may transition into the C3 state 307, also referred to as the Deep Sleep state, in response to the I/O controller 225 or other chipset feature asserting a CPUSLP# signal and then a DPSLP# signal or other similar signals. In the Deep Sleep state, in addition to powering down internal processor circuitry, all phase-lock loops (PLLs) in the processor 205 may be disabled. Further, for some embodiments, a STOP_CPU signal may be asserted by the input/output controller 225 and received by the clock generator 211 to cause the clock generator to halt the clock signal CLK to the CPU 205.

In the system 200 of FIG. 3, a transition to the C4 or Deeper Sleep state 309 may be undertaken in response to ACPI software 250 detecting that there are no pending processor interrupts, for example. ACPI software may do this by causing the ICH 225 to assert one or more power management-related signals such as the exemplary Deeper Stop (DPRSTP#) signal. For some embodiments, a Deeper Sleep Voltage Regulator (DPRSLPVR) signal may be asserted concurrently to indicate to the voltage regulator 212 to enter a lower power state.

The Deeper Stop (DPRSTP#) signal is provided directly from the chipset to the processor and causes central power management logic 234 on the processor to initiate a low frequency mode (LFM). For the low frequency mode, the processor may transition to the minimum or another low operating frequency, for example. Where the processor includes Intel® SpeedStep® or an analogous power management technology, the minimum operating frequency may be the lowest SpeedStep technology frequency (or corresponding frequency for the analogous technology) as described above. Assertion of the DPRSTP# signal may further cause the internal VID target to be set to the minimum operating voltage, or another operating voltage associated with the C4 state and the LFM frequency as indicated in the VID table 277. The voltage transition upon entering the C4 state is described in more detail below.

With continuing reference to FIG. 1, when the processor 205 is in one of the power management states C1-C4, certain events may indicate a need to transition to a higher power state. In particular, when the processor 205 is in a C4 state 309, if a bus event, such as a bus snoop is received, there may be a need to transition to a C2 state, for example.

For one embodiment, the processor may effectively pop out of the C4 state 309 through a LFM C3 state 311 to a LFM C2 state 313 in a relatively short amount of time (e.g. approximately 35 us for one embodiment) to enable the snoop to occur. By transitioning from C4 to C2 while remaining in LFM, it may be possible to respond to bus events more quickly. In this manner, the processor 205 may be capable of entering the C4 state between USB, AC97 and/or other device memory access frames, for example. Where this capability is provided, the C4 state may alternately be referred to as a C4E state.

When the snoop is finished, following a predetermined timeout period, the chipset may then cause the processor 205 to transition back into the C4 state 309. For some embodiments, while in the C2 LFM state 313, if a break event such as an interrupt is received prior to the timeout period, the processor may instead transition to the C0 state. The processor may do so through an intermediate C0/C1 state 315 in which the operating voltage and frequency have not yet been restored to their previous values. Previous operating frequency/voltage settings may then be restored upon transitioning back to the C0 state 301 as shown. The transition to the C0 state 301 and back to a previous operating voltage/frequency pair may occur under the control of power management logic 234 through intermediate voltage/frequency pairs. Where the processor 205 incorporates SpeedStep technology, for example, the processor may undergo SpeedStep transitions to arrive at the previous operating voltage/frequency pair.

By providing an approach for quickly transitioning from the very low power C4 state to the C2 state according to some embodiments, it may be possible for systems, such as the system 200 to enter the C4 state even with active USB, AC'97 or other I/O devices that require low latencies. Further details of the low latency exit from the C4 state are now described in reference to FIGS. 4-8.

Figure 4:
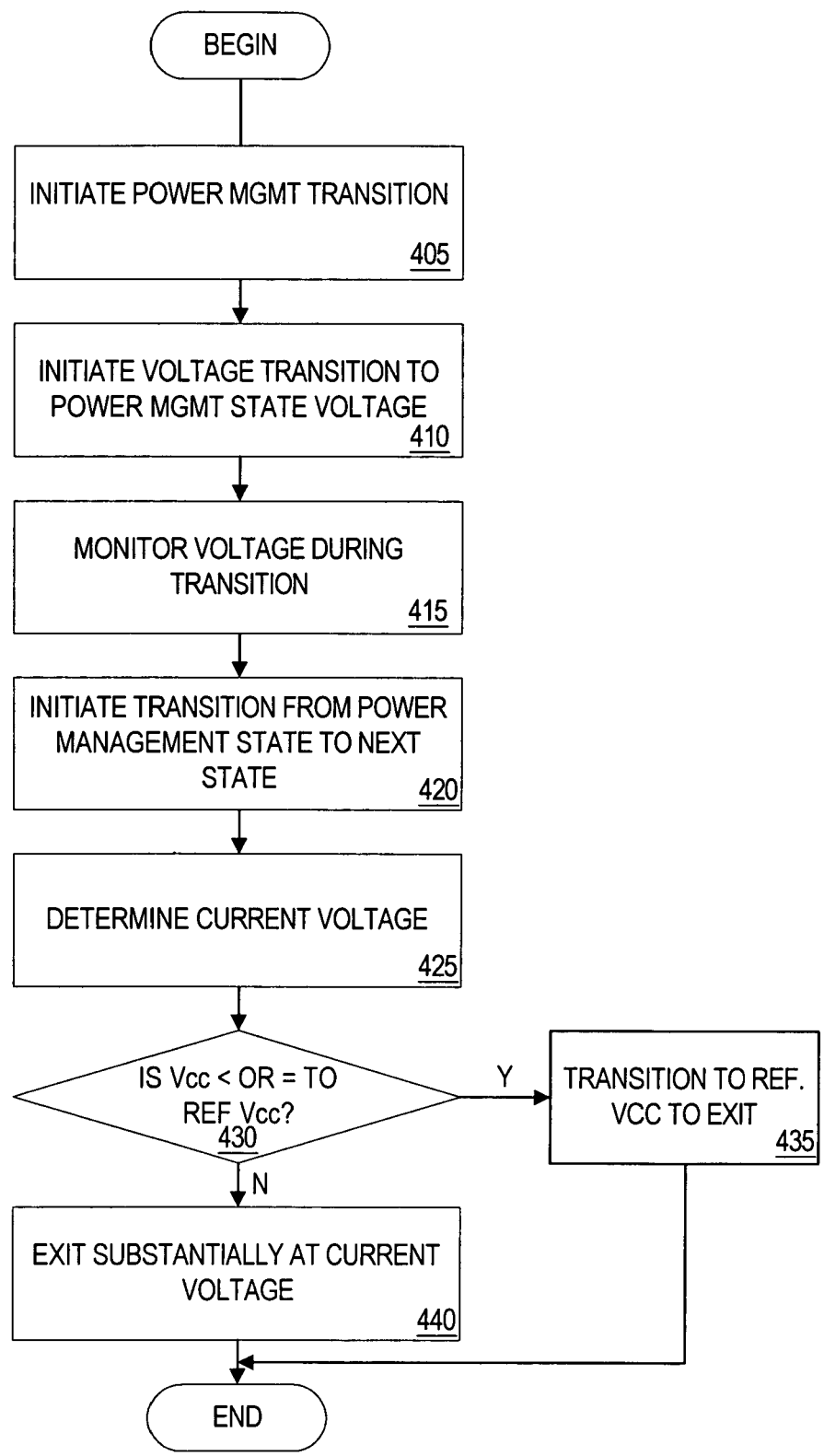
FIG. 4 is a flow diagram showing a power management state transition control approach of one embodiment.
Figure 5:
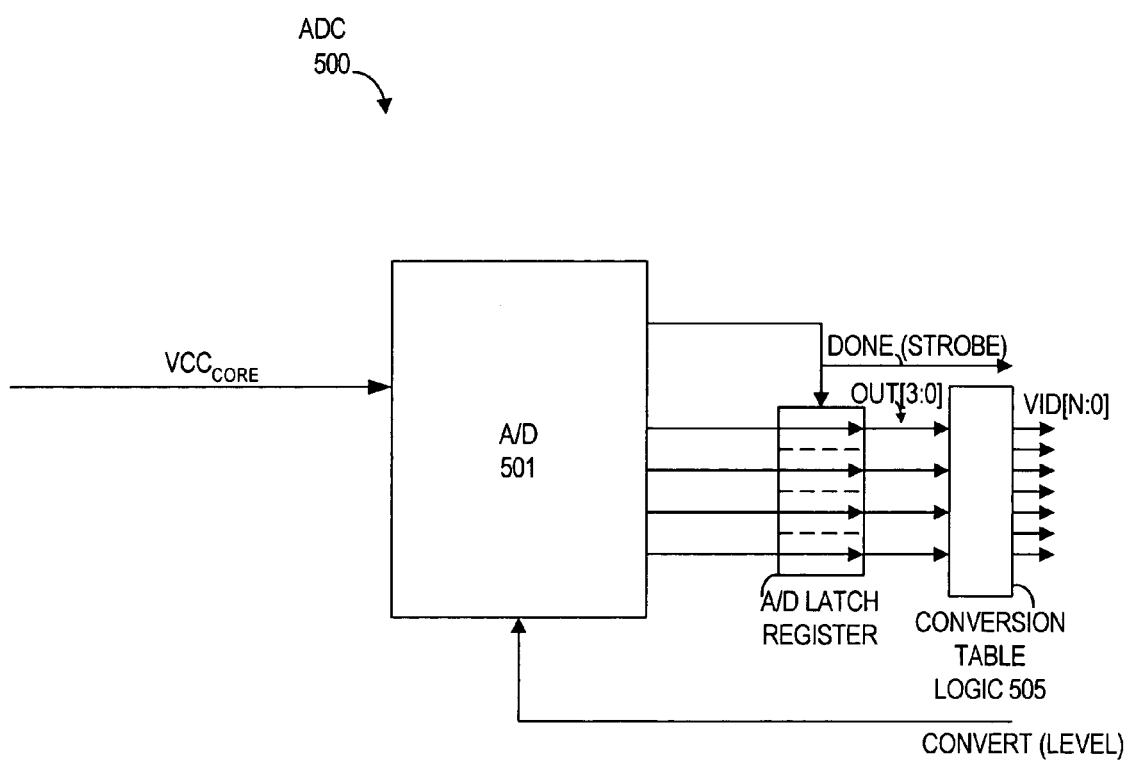
FIG. 5 is a diagram of an exemplary analog-to-digital converter that may be advantageously used in the computing system of FIG. 3.
Figure 8:
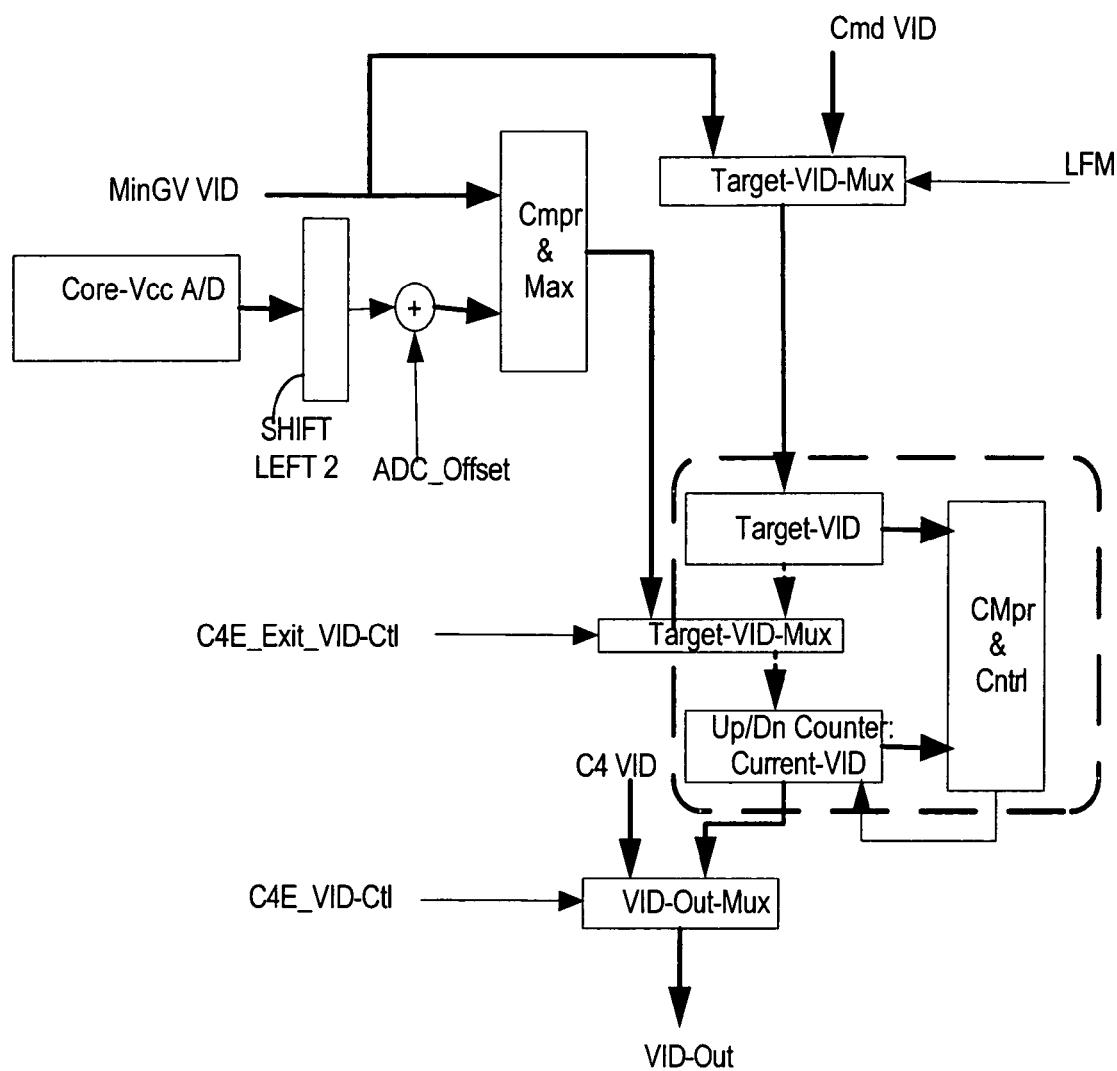
FIG. 8 is a block diagram of exemplary Deeper Sleep entry/exit logic that may be advantageously used in the system of FIG. 3, for example.

FIG. 4 is a flow diagram showing the power management state transition control approach of one embodiment. While FIGS. 3, 5 and 8 are referred to in order to show specific exemplary hardware that may be used to practice the method of FIG. 4, it will be appreciated that the method of FIG. 4 may be practiced using various other software and/or hardware modules.

Referring to FIG. 4, for one embodiment, in response to detecting a predetermined event or condition, a power management state transition to the Deeper Sleep or C4 state, for example, may be initiated at block 405.

At block 410, a voltage transition from a current voltage level to a lower voltage level associated with the C4 state is then initiated.

For the system 200 of FIG. 2, for example, this transition may be initiated by Deeper Sleep Entry/Exit Logic 275 responsive to the deeper stop (DPRSTP#) signal being asserted. The Deeper Sleep Entry/Exit logic 275 may include logic to determine the VID to be provided to the voltage regulator 212 over the bus 235 as described in more detail below in reference to FIG. 7. The VID may be a multi-bit value (e.g. 7 bits for one embodiment) that corresponds to a particular voltage to be driven by the voltage regulator 212.

For one embodiment, a specific voltage may be associated with the power management state to which the processor is transitioning. For example, for the Deeper Sleep or C4 state, there may be a C4 voltage and a corresponding C4 VID. The logic 275 causes the C4 VID to be driven onto the bus 235 and, in response, the voltage regulator 212 begins transitioning from the current supply voltage provided to the processor over the signal line 240 to the lower C4 voltage. Processor leakage then causes the voltage to transition down towards the C4 voltage setting.

Referring back to FIG. 4, at block 415, for some embodiments, the voltage is monitored as it transitions from the previous voltage setting to the target voltage setting.

For the system 200, the analog to digital converter (ADC) 280 may be used to monitor the voltage transition either on the signal line 240 or at a point internal to the processor. The ADC 280 may be integrated on the processor 205 or may be provided as part of a separate integrated circuit. An exemplary ADC 500 that may be used to provide the ADC 280 of FIG. 3 is described in reference to FIG. 5, which shows a diagram of an ADC of one embodiment.

For one embodiment, the ADC 500 includes a 4-bit Analog to Digital (A/D) core 501 and operates on a backup ring oscillator of the host processor. The ADC 500 may be enabled once the bus clock is stopped (in response to the Deep Sleep signal), for example, to sample the Vcc level on an output signal line such as the signal line 240, or at a point internal to the host chip.

The A/D range (i.e. minimum and maximum sampling points) may depend on minimum and maximum Vcc to be supplied to the host processor or other chip that is to use the ADC. For some embodiments, the final range may be decided after manufacture and may be programmed using fuses or another approach. In particular, for one embodiment, a 4-bit fuse-programmed offset (not shown) may be added to the A/D reading in order to accommodate for changes in minimum and/or maximum Vcc after the integrated circuit chip is manufactured. This offset may be in predetermined increments, e.g. 25 mV, covering a predetermined range, e.g. +175 mV to −200 mV for one embodiment. It may be preferable, however, to design the A/D core 501 to cover a wide voltage range because it may be difficult or impractical to later change the ADC itself.

With the uncertainty in the final min/max Vcc, it may be desirable in some cases to cover the full range of the voltage regulator, e.g. the voltage regulator 212 for the system 200 of FIG. 3. The A/D core 501 range may be determined by taking the indicated margins into account. For example, for a voltage regulator with a range of 0.7125V-1.5V, taking into account the exemplary 200 mV reduction from the max point and the margin mentioned above, the A/D range may be calculated to be from 0.667V to 1.333V.

Desired accuracy on the A/D core 501 may depend on a variety of factors and may be specific to the particular platform with which it will be used. For some embodiments, the A/D accuracy is designed such that a VID driven to the voltage regulator based on the A/D output will correspond to the pin voltage within a given range to ensure that a given voltage transition can take place within a desired latency target. For some embodiments, 4-bit accuracy is sufficient, for example, however different accuracies may apply to different embodiments.

As a specific illustration, where the host processor is a microprocessor and the target voltage transition time from, for example, the C4 state to one of the C3 states (e.g., LFM C3) is about 20-25 us, it may be desirable to require that the VID driven to the voltage regulator based on the A/D 501 output is above the actual pin voltage and below the actual pin voltage+200 mV. Other ranges may be within the scope of other embodiments.

Where 4-bit accuracy is sufficient and the range is the same as the example given above, the A/D step may be approximately 44.4 mV. The requirements depend on assumptions for minimum and maximum IR drop and minimum and maximum Vcc.

It may be desirable to reduce the A/D 501 range by any possible error, such as IR drop uncertainty from pin to A/D, voltage drift between a time a voltage is sampled and the time a VID is driven, A/D error, etc. With this in mind, for some embodiments, the A/D rounds the measured voltage up to the next A/D point to indicate the current voltage.

The A/D conversion time should be small relative to the specified transition time from one state to the next. For example, where the C4 to LFM C3 exit time is specified at 20 uS, the A/D conversion time should be a relatively small percentage of that window such as 0.5-1 us. Other latencies and exit times may be associated with other embodiments.

For some embodiments, the highest voltage that the A/D should be able to measure is a predetermined margin below the maximum voltage to be supported by the host chip, or the chip that is using the ADC capabilities. For such embodiments, when the A/D core 501 reads the maximum voltage that it is capable of reading, it means that the Vcc is at that point or higher and the VID associated with the maximum operating voltage is driven.

Similarly, for some embodiments, the lowest Vcc the A/D core should be able to measure is the minimum operating voltage minus an associated margin. Then, when the ADC reads the minimum voltage that it is capable of reading, it means that the Vcc is at this point or lower and the VID associated with the minimum operating voltage is driven.

The ADC 500 samples the desired voltage, converts it to a digital ADC output that is then converted to a VID. For one embodiment, ADC voltage readings may be rounded up to the next closest ADC point. Where the ADC 500 is used to provide the ADC 280 of FIG. 3, the ADC may perform the conversion when the Vcc ramps down on C4 entry, until it reaches a predetermined voltage such as a reference voltage or the target C4 voltage, for example. Optionally, the ADC may do a similar conversion on exit from the C4 state. A CONVERT signal may be used to enable and disable conversions. The CONVERT signal of one embodiment may be set or asserted in response to the DPRSTP signal being asserted and may be cleared or deasserted in response to the DPRSTP signal being deasserted or the ADC is at its lowest point (e.g. 0). It will be appreciated that conversions may be performed at another time or enabled in another manner for other embodiments.

With continuing reference to FIG. 5, the ADC 500 may provide an output signal DONE indicating that a conversion has been completed. Where the ADC 500 is a 4-bit ADC, a 4 bit ADC output Out[3:0] is also provided. This output may be held stable until the next conversion ends and may be cleared during a reset or when a CONVERT signal is asserted. When the CONVERT signal is asserted, conversions may be performed repetitively, sampling the result at the end, and signaling DONE for each conversion.

As shown in FIG. 5, a translation and compare block (e.g. conversion table logic 505) may be coupled to receive the output of the A/D core 501 and translate it to a VID. For the embodiments represented by FIG. 5, the A/D core 501 output is 4 bits while the VID is 7 bits. To perform this translation, the translation and compare block 505 may include or access the VID table 277 which may include entries indicating ADC output readings and associated VIDs. The translation and compare block 505 may further compare the calculated VID against minimum and maximum VID values to make sure that the driven VID is within the allowed range. This comparison may be performed in the above-mentioned fuse logic (not shown) for all sources of VID data.

In order to perform the translation for one embodiment, the logic should add the maximum IR drop to the A/D reading, convert it to 7 bits, and add the shifted fuse-programmed offset value discussed above. If the A/D core resolution is 50 mV for the specific example provided above, then a 2-bit shift left of the A/D output may be used for the first stage, for example and may be sufficient for other stages also, even taking into account the increased IR drop with increasing Vcc. As mentioned above, the conversion does not necessarily need to be very accurate so long as the calculated VID is above the actual pin voltage, as it is less demanding for the voltage regulator to slew its voltage in an upwards transition very quickly.

Further, as described above, the fuse-programmed offset may compensate for future shifts in the VID table's low Vcc point. The signed addition in the described conversion may be done with a saturating adder in both directions for some embodiments to make sure that there is no overflow or underflow. It will be noted that the A/D output is unsigned while the offset is signed.

The ADC 500 of some embodiments may also incorporate testability features (not shown) in order to allow for reading of the ADC output and DONE bits, for example, allowing microcode to initiate an ADC conversion and read the result, and allowing an override value for the ADC output. Adjustment features may also be included as mentioned above. In addition to the fuses (e.g. four for one embodiment) that may be used to compensate for process variations and allow an offset to be added to the ADC reading in case of changes to the VID table, other adjustment features, such as an adjustment fuse override to provide for ADC calibration, may also be included.

For some embodiments, there may be certain requirements for the VID controls in order for the above-described ADC 500 to provide for proper operation. For example, for the ADC 500 with the characteristics of the exemplary embodiment described above, the VID increments may be near or equal to 12.5 mV. Further, the VID may use only a certain number of bits, e.g. 7 for the example above, for the active segment (C0 time) in order to maintain the specified timings. The VID "0" cross-over point may also be specified depending on the available ADC offset and may be between 0.867V and 0.492V for the specific example embodiment described above for which the ADC offset available may be 0.667V+200 mV or −175 mV. It will be appreciated that values other than the example values provided above may apply to other embodiments.

It will also be appreciated, that while several details of an example ADC have been provided in the description, these details are not necessary for some embodiments. For various embodiments, an alternative ADC design may be used for the embodiments that include an ADC, so long as it is capable of measuring a current voltage in accordance with the description herein.

Referring back to FIG. 4, at block 420, a bus event, break event or other exit condition occurs that initiates a transition from the Deeper Sleep state to a second state, which may be another power management state or a fully operational state. At block 425, a current supply voltage is determined.

For example, for the system 200 of FIG. 3, in response to a bus event, or possibly a break event or other exit condition indicating that the processor 205 needs to exit the Deeper Sleep state, the Deeper Stop (DPRSTP#) and, optionally, the Deeper Sleep (DPRSLP#) signals may be deasserted. The current supply voltage level on the signal line 240 may then be determined using the ADC 280 as described above, or another approach. Where the ADC 280 is used, the current supply voltage may be indicated by the VID associated with the most recent ADC output as described above. Alternatively, the current supply voltage may be determined in response to occurrence of the exit condition.

At block 430, it is then determined whether the current voltage level is less than or equal to a predetermined reference voltage. For one embodiment, the predetermined reference voltage may be the minimum operating voltage, but other reference voltages may be used for other embodiments. The determination of whether the current voltage level is less than or equal to the reference voltage may be made by comparing the VID associated with the current voltage with a VID associated with the reference voltage, for example. Depending on the current voltage level, transition to an exit voltage is initiated at block 435 or 440.

For one embodiment, the exit voltage may be the higher of a reference voltage, such as the minimum operating voltage, and the measured Vcc. As discussed above, the minimum operating voltage may be a minimum sustainable voltage that maintains the internal state of the associated device, a minimum operating voltage associated with a specific power management technology, or a minimum operating voltage for the target state, for example. Other criteria for determining the minimum operating voltage and/or the desired reference voltage to be used are within the scope of various embodiments.

For the system 200, if the current voltage level (in this case Vcc) is determined to be equal to or lower than the predetermined reference voltage, e.g. where the predetermined reference voltage is the minimum operating voltage, the current voltage level may be equal to or lower than the minimum operating voltage if the supply voltage is already at or near the lower C4 voltage described above, then the processor 205 initiates a transition to the reference operating voltage. This transition may be undertaken by driving the VID associated with the reference operating voltage on the bus 235. The processor voltage is then slewed from its current voltage level to the minimum operating voltage (or other predetermined reference voltage).

Figure 6:
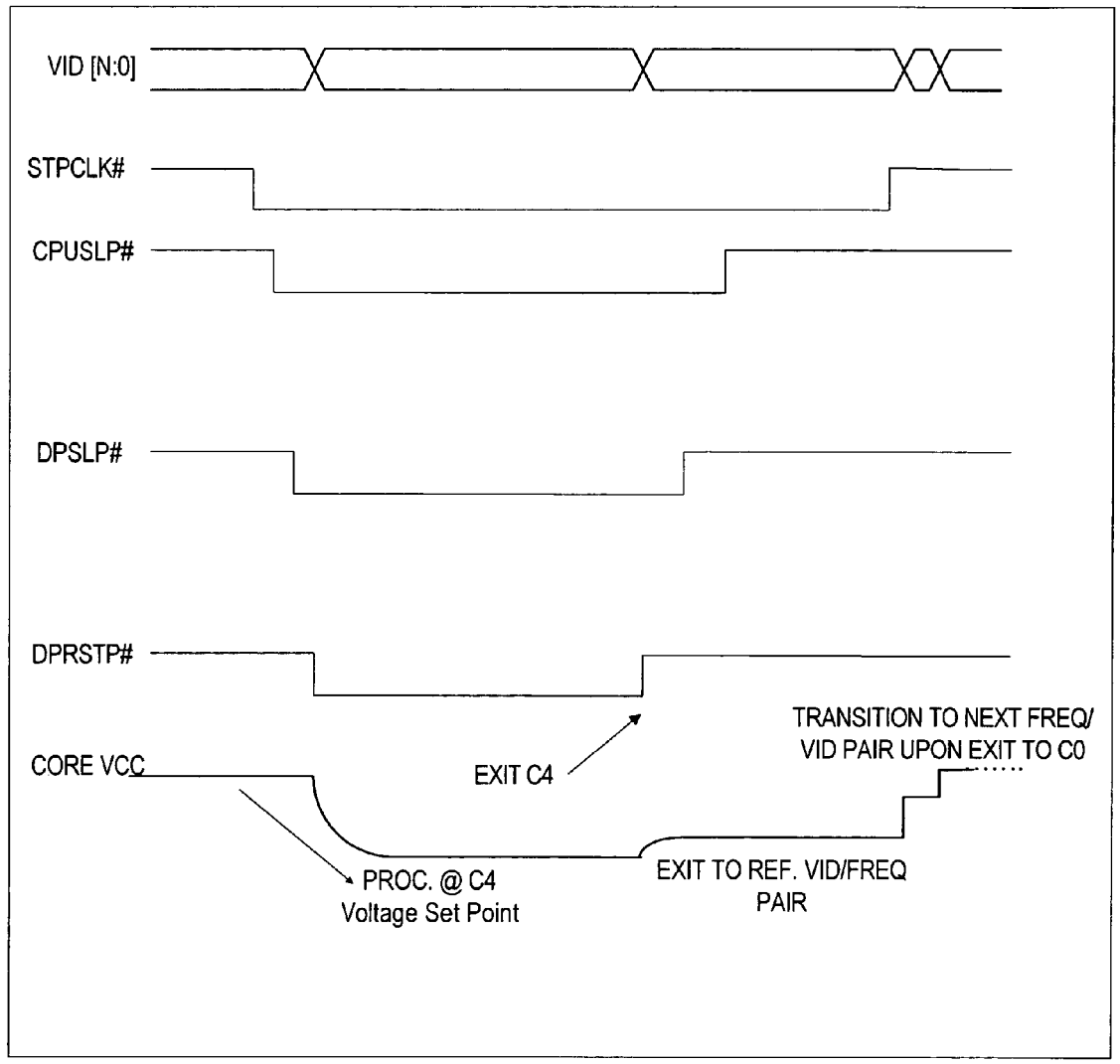
FIG. 6 is a timing diagram illustrating relative signal transitions associated with an aspect of the power management state transition control approach of one embodiment.

FIG. 6 is an exemplary timing diagram illustrating the signal transitions that may take place in the system 200 for one embodiment where the voltage level after a bus event, break event or other C4 exit condition is determined to be below the reference operating voltage.

Referring back to FIGS. 3 and 4, if instead, the current Vcc is determined to be higher than the reference operating voltage, which may occur, for example, if the bus, break or other event causing the transition out of the C4 state occurs close to the C4 state entry point, the Deeper Sleep logic 275 returns Vcc control to substantially the current Vcc level upon C4 exit at block 440. In this manner, excessive discharge delay at the voltage regulator 212 output capacitors is prevented. For one embodiment, the processor 205 accomplishes this by driving the VID based on the ADC output on the bus 235.

For another embodiment, the exit voltage may be set at the next highest voltage of the operational voltage/frequency pairs. This voltage may be determined from the look-up table 277 or the power management unit 234.

Where the exit voltage is not the reference operating voltage (e.g. the minimum operating voltage), for some embodiments, once the bus clock is re-enabled (e.g. in response to the DPSLP# signal being deasserted), the power management logic 234 may cause the Vcc level to be sequenced down to the reference operating voltage if the reference operating voltage was not previously reached. To reduce the voltage to the reference voltage level, the power management logic may cause successive VIDs to be driven over the bus 235 until the reference voltage level is reached.

Figure 7:
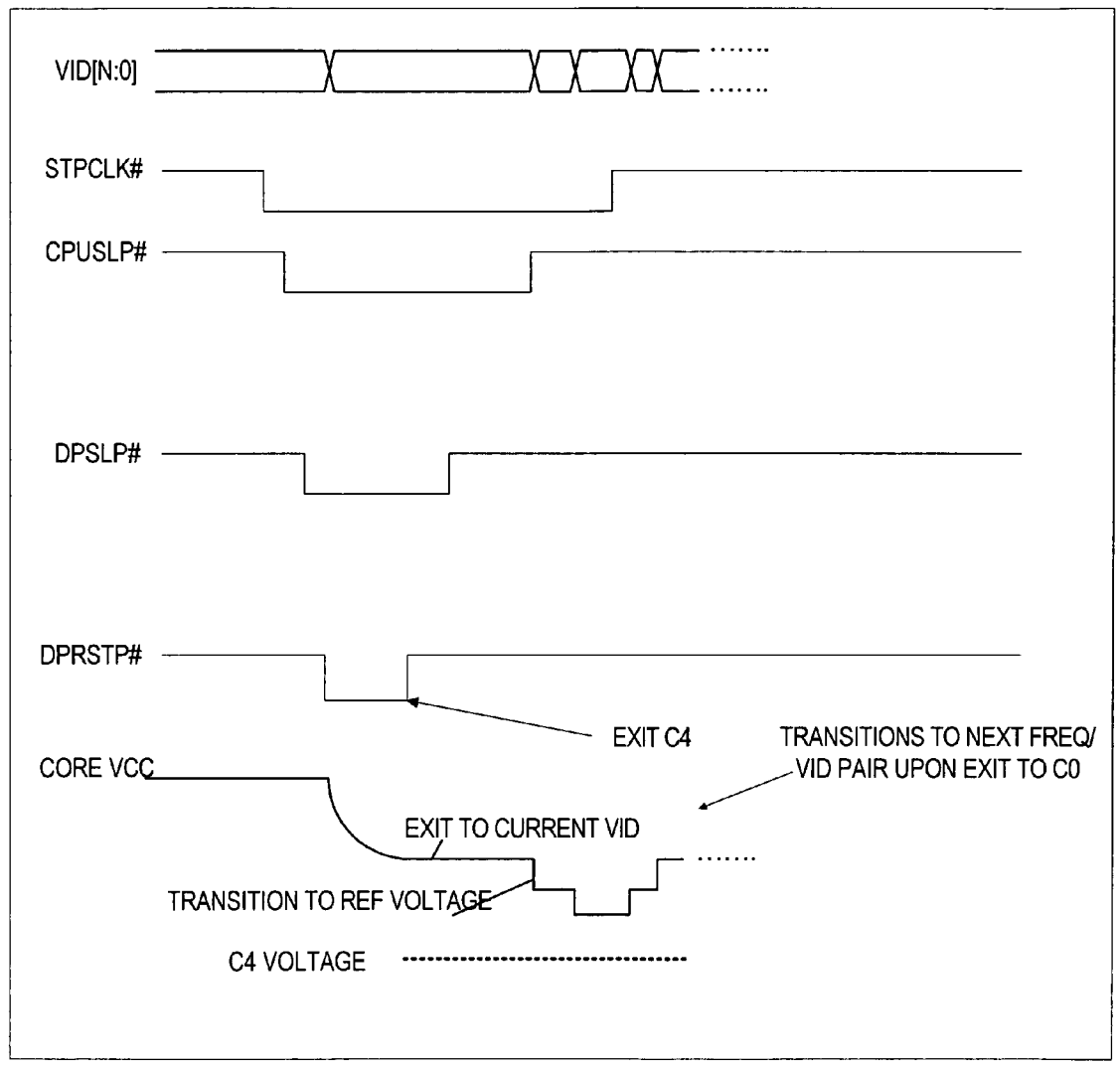
FIG. 7 is a timing diagram illustrating relative signal transitions associated with another aspect of the power management state transition control approach of one embodiment.

FIG. 7 is an exemplary timing diagram illustrating the signal transitions that may take place in the system 200 for one embodiment where the voltage level after a break event or other C4 exit condition is determined to be above the reference operating voltage.

FIG. 8 is a block diagram of exemplary deeper sleep entry/exit logic 700 that may be used to provide at least the VID control portion of the deeper sleep entry/exit logic 275 for the system 200 of FIG. 3.

In operation, similar to the description above, upon assertion of the DPRSTP# signal (and optionally, the DPRSLP# signal), the C4 VID will be driven onto the pins. The ADC samples the core Vcc during the C4 transition period to measure the actual voltage ramp on the core.

Once DPRSTP# signal is negated, the VID is loaded with either the current Vcc voltage (if it has not reached the reference operating voltage or below), or with the reference operating voltage shown as MinGV in FIG. 8. Once the processor is eventually ready to transition out of the low frequency mode (e.g. transition into C0), if the reference operating frequency has been reached, a new higher voltage, referred to as the command operation point, may be set as the target VID.

Using the above-described approaches of one or more embodiments, it may be possible to further decrease power consumption by conserving energy that was previously wasted by larger voltage transitions upon exiting deeper sleep and other similar power saving modes. Phase Lock Loop (PLL) lock time and time to respond to bus events may also be reduced according to various embodiments. Decreasing power consumption may also result in longer battery life for systems that use a battery. Further, it may be possible for some embodiments to transition into and out of deeper sleep and/or other power management states more quickly such that the performance impact for such transitions may be reduced. This approach may also help to reduce acoustic noise associated with state transitions by reducing power delivery circuit output capacitor charging and discharging.

It will be appreciated that, while exemplary embodiments have been described in reference to transitions into and out of a deeper sleep or C4 state associated with a microprocessor, various embodiments may be applied to transitions to and from different power states and/or for different types of integrated circuits. Further, although voltage control is accomplished using VID signals for the exemplary embodiments described herein, other approaches to providing voltage control are within the scope of various embodiments.

Thus, various embodiments of a method and apparatus for controlling power management transitions are described. In the foregoing specification, the invention has been described with reference to specific exemplary embodiments thereof. It will, however, be appreciated that various modifications and changes may be made thereto without departing from the broader spirit and scope of the invention as set forth in the appended claims. For example, for some embodiments, an ADC may not be used and the current voltage level may be determined according to a VID being driven. For such an embodiment, the processor may transition to lower frequencies through successive intermediate VID settings. The specification and drawings are, accordingly, to be regarded in an illustrative rather than a restrictive sense.

What is claimed is:

1. A method comprising:
    transitioning to a first power management state;
    monitoring the current voltage level during the transition to the first power management state;
    receiving an indication to transition from the first power management state to a second state; and
    exiting the first power management state at a higher voltage of a reference operating voltage and a current voltage.

2. The method of claim 1 wherein
    transitioning to the first power management state includes transitioning to a deeper sleep (C4) state.

3. The method of claim 2 wherein
    exiting the deeper sleep state includes transitioning from the deeper sleep state to a deep sleep state.

4. The method of claim 1 further comprising
determining the current voltage level using an analog to digital converter (ADC); and
providing a digital voltage identification (VID) representation based on the determined current voltage level, the VID to be provided to a voltage regulator.

5. The method of claim 4 further comprising:
determining whether the current voltage level is higher than the reference operating voltage by comparing respective VIDs.

6. The method of claim 1 wherein monitoring the current voltage level includes using an analog to digital converter.

7. The method of claim 1 wherein exiting the first power management state at a higher voltage of a reference operating voltage and a current voltage includes exiting the first power management state a higher of a minimum operating voltage and the current voltage.

8. The method of claim 7 further comprising receiving a bus event,
wherein exiting the first power management state includes exiting a deeper sleep state and transitioning to a low frequency mode C2 state to handle the bus event.

9. The method of claim 8 further comprising
transitioning to the minimum operating voltage after exiting the deeper sleep state if the minimum operating voltage was not the higher voltage.

10. An apparatus comprising:
power management state transition logic responsive to assertion of at least a first power management signal to initiate a transition to a first power management state for an integrated circuit; and
an analog to digital converter to monitor a current voltage supplied to the integrated circuit, wherein the analog to digital converter to monitor the level of the current voltage at least during the transition to the first power management state,
the power management state transition logic further responsive to deassertion of the at least first power management signal to cause the integrated circuit to exit the first power management state at the higher of the current voltage and a reference operating voltage associated with the integrated circuit.

11. The apparatus of claim 10 wherein the first power management state is a deeper sleep (C4) state.

12. The apparatus of claim 10 wherein the reference operating voltage is a minimum operating voltage.

13. The apparatus of claim 12 wherein the first power management state is a deeper sleep (C4) state and wherein deassertion of the first power management signal occurs in response to a bus event.

14. The apparatus of claim 13 wherein the integrated circuit transitions to a C2 state to handle the bus event.

15. The apparatus of claim 10 wherein the integrated circuit is a processor, the first power management state is a deeper sleep state (C4) and the power management signal is received by the processor.

16. A method comprising:
operating an integrated circuit in a deeper sleep (C4) state;
receiving a bus event;
exiting the C4 state in response to the bus event at the higher of a reference voltage and a current voltage at which the integrated circuit is operating; and
monitoring the level of the current voltage during the exiting of the C4 state.

17. The method of claim 16 wherein receiving the bus event includes receiving a bus snoop.

18. The method of claim 16 wherein exiting the C4 state in response to the bus event includes exiting at the higher of a minimum operating voltage and a current voltage, the method further including transitioning to a C2 state at the exit voltage or lower.

19. The method of claim 18 further comprising determining the current voltage of the integrated circuit using an analog to digital converter.

20. The method of claim 18 further comprising:
monitoring a voltage of the integrated circuit using an analog to digital converter; and
determining the current voltage of the integrated circuit using the analog to digital converter.

21. A system comprising:
a processor capable of operating in a first set of states including at least a first power management state, wherein the processor is further capable of exiting the first power management state at a higher of a reference voltage and a current voltage in response to receiving an indication to exit the first power management state;
an analog to digital converter coupled to the processor to monitor a current processor voltage when enabled; and monitor the level of the current processor voltage during the exit from
the first power management state;
an input/output controller coupled to the processor; and
a battery connector coupled to the input/output controller to receive a battery.

22. The system of claim 21 wherein the first power management state is a deeper sleep (C4) state.

23. The system of claim 21 wherein the reference voltage is a minimum operating voltage associated with a low frequency operating mode (LFM).

24. The system of claim 23 wherein the indication to exit the first power management state is a bus event.

25. The system of claim 24 wherein the bus event is a bus snoop and wherein the processor is further capable of transitioning to a C2 power management state in the LFM in response to the bus event.

26. The system of claim 25 wherein, once the processor is in the C2 power state in the low frequency mode, if a timeout period expires without occurrence of a break event, the processor transitions back to the C4 state and, if a break event occurs before expiration of the timeout period, the processor initiates a transition to a C0 operational state.

27. The system of claim 21 wherein the analog to digital converter is integrated with the processor.

28. The system of claim 21 further including a voltage regulator to supply the voltage to the processor, the voltage regulator responsive to voltage identification (VID) data from the processor to determine the voltage to be provided to the processor.

29. The system of claim 28 wherein the analog to digital converter determines a current voltage and wherein the analog to digital converter is coupled to conversion logic to convert the determined voltage to a corresponding VID.

* * * * *